(12) United States Patent
Khayrallah et al.

(10) Patent No.: US 8,396,168 B2
(45) Date of Patent: Mar. 12, 2013

(54) CHANNEL ESTIMATION FOR EQUALIZER USING SERIAL LOCALIZATION WITH INDECISION

(75) Inventors: Ali S. Khayrallah, Cary, NC (US); Chester Park, Santa Clara, CA (US); Yi-Pin Eric Wang, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 269 days.

(21) Appl. No.: 12/760,839

(22) Filed: Apr. 15, 2010

(65) Prior Publication Data

US 2011/0255638 A1   Oct. 20, 2011

(51) Int. Cl.
*H04L 27/00* (2006.01)
(52) U.S. Cl. ......... 375/324; 375/229
(58) Field of Classification Search ......... 375/224, 375/348, 350, 229, 148, 316, E1.03
See application file for complete search history.

(56) References Cited

U.S. PATENT DOCUMENTS

| | | | |
|---|---|---|---|
| 8,063,807 B1* | 11/2011 | Lai et al. | 341/144 |
| 2004/0052317 A1 | 3/2004 | Love et al. | |
| 2005/0195889 A1* | 9/2005 | Grant et al. | 375/148 |
| 2005/0243943 A1* | 11/2005 | Stirling-Gallacher | 375/267 |
| 2007/0104253 A1* | 5/2007 | Luo et al. | 375/148 |
| 2008/0152032 A1* | 6/2008 | Lee et al. | 375/260 |
| 2009/0196333 A1* | 8/2009 | Cozzo | 375/225 |
| 2010/0040027 A1* | 2/2010 | Camp et al. | 370/335 |

FOREIGN PATENT DOCUMENTS

| | | |
|---|---|---|
| EP | 1 703 686 A1 | 9/2006 |
| WO | WO 01/39454 A1 | 5/2001 |
| WO | WO 2011/024127 A2 | 3/2011 |
| WO | WO 2011/024128 A2 | 3/2011 |

* cited by examiner

*Primary Examiner* — Aristocratis Fotakis

(57) ABSTRACT

In a receiver with a multi-stage equalizer, such as an SLI equalizer, cumulative symbol estimates generated in one or more early stages of the equalizer are used as effective pilot symbols to improve channel estimation for later stages.

25 Claims, 7 Drawing Sheets

CHANNEL ESTIMATION FOR EQUALIZER USING SERIAL LOCALIZATION WITH INDECISION

TECHNICAL FIELD

The present invention generally relates to equalization, and more particularly relates to equalization based on serial localization with indecision.

MLSE (Maximum Likelihood Sequence Estimation) is a demodulation technique that also equalizes ISI (Inter-Symbol Interference) in a signal which is modulated in accordance with a particular constellation and transmitted over a channel. ISI causes the equalization complexity to increase as a power of the constellation size. Relatively large signal constellations such as 16-, 32- and 64-QAM (Quadrature Amplitude Modulation) have been adopted in EDGE (Enhanced Data Rates for GSM Evolution), HSPA (High Speed Packet Access), LTE (Long Term Evolution), and WiMax (Worldwide Interoperability for Microwave Access). In HSPA, multi-code transmission creates even larger effective constellations. Also, MIMO (Multiple-Input, Multiple-Output) schemes With two or more streams have been adopted in HSPA, LTE and WiMax. MIMO implementations also yield relatively large effective constellations. ISI causes equalization complexity to further increase when any of these techniques occur in combination, e.g. multi-code and MIMO.

In the ISI context, the ideal equalization scheme is MLSE, in the sense of maximizing the probability of correctly detecting the transmitted sequence of symbols, or sequences of symbols in the MIMO case. However, the complexity of MLSE increases substantially as a function of the size of the modulation constellation and/or because of the exponential effects of MIMO or multi-codes to the point where MLSE becomes impractical. Less complex solutions are available, such as DFSE (Decision-Feedback Sequence Estimation), DFE (Decision-Feedback Equalization), etc. Each of these solutions attempts to strike a balance between accuracy and complexity.

Another conventional equalization technique is MSA (Multi-Stage Arbitration). MSA involves sifting through a large set of candidates in multiple stages, where each stage rejects some candidates until a single candidate is left after the final stage. One specific example of MSA is generalized MLSE arbitration where the first stage is a linear equalizer and the second stage implements MLSE based on a sparse irregular trellis over a reduced state space.

Iterative Tree Search (ITS) has also been used for performing equalization in MIMO QAM environments. ITS exploits the triangular factorization of the channel. In addition, ITS uses the M-algorithm for reducing the search for the best candidate. ITS breaks down the search further, by dividing the QAM constellation in its four quadrants, and representing each quadrant by its centroid in intermediate computations. The selected quadrant itself is subdivided again into its 4 quadrants, and so on. This results in a quaternary tree search. Other conventional approaches give particular attention to the additional error introduced by the use of centroids instead of true symbols. The error is modeled as Gaussian noise whose variance is determined and incorporated in likelihood computations. However, a tight connection is typically made between the centroid representation and the bit mapping from bits to symbols. That is, if a so-called multi-level bit mapping is employed, then identifying a quadrant is equivalent to making a decision on a certain pair of bits. Such constraints place a restriction on bit mappings, restricting the design of subsets.

Serial localization with indecision (SLI) is another approach to equalization that approximates an MLSE equalizer with reduced complexity. In a receiver using SLI, equalization is performed in a series of stages for suppressing ISI. Each non-final stage attempts to further localize the search for a solution for the benefit of the next stage, based on input from the previous stage.

Viewed in isolation, a given SLI equalization stage can be quite indecisive, but makes progress and avoids an irreversible wrong decision. A given equalization stage localizes the solution by inputting a subset representative of the constellation and outputting a further reduced subset. Each stage makes a choice among candidate reduced subsets. Indecision arises from representing the modulation constellation with overlapping subsets. Indecision is beneficial in a multi-stage structure, because indecision discourages an irreversible bad decision in an early stage.

DETAILED DESCRIPTION

Figure 1:
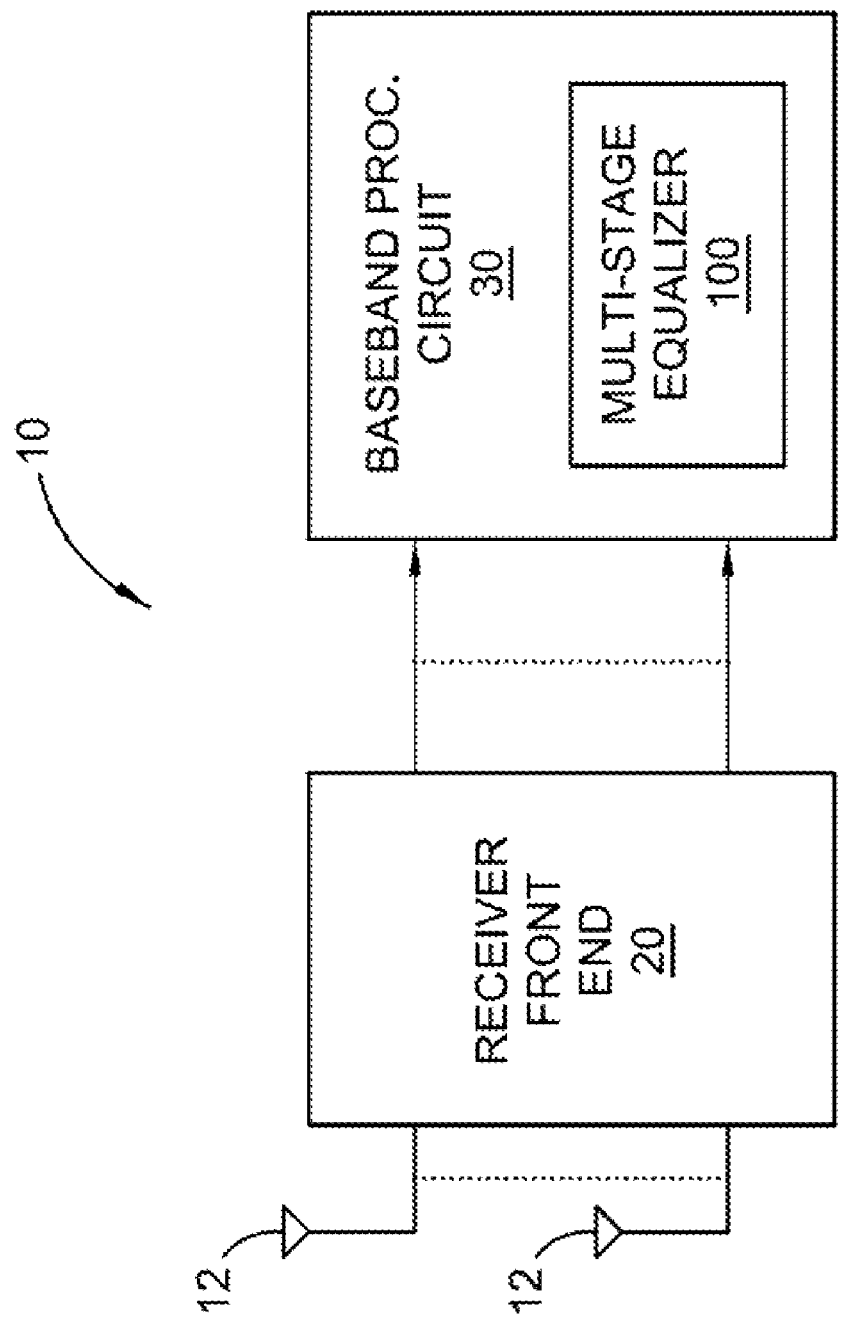
FIG. 1 illustrates a block diagram of an embodiment of a receiver including a multi-stage SLI equalizer and a constellation processing module.

Referring now to the drawings, FIG. 1 illustrates an exemplary receiver 10. Receiver 10 comprises receive circuits 20 coupled to one or more receive antennas 12 and baseband processing circuits 30. The receive circuits 20 downconvert the received signal to baseband frequency, filter and amplify the received signal, and perform analog-to-digital conversion to produce an input sample stream suitable for input to the baseband processing circuits 30. The baseband processing circuits 30 comprise one or more processors, hardware, firmware, or a combination thereof, for processing the received sample stream. The baseband processing circuits 30 include a multi-stage equalizer 100 to mitigate intersymbol interference (ISI) in the received signal.

Figure 2:
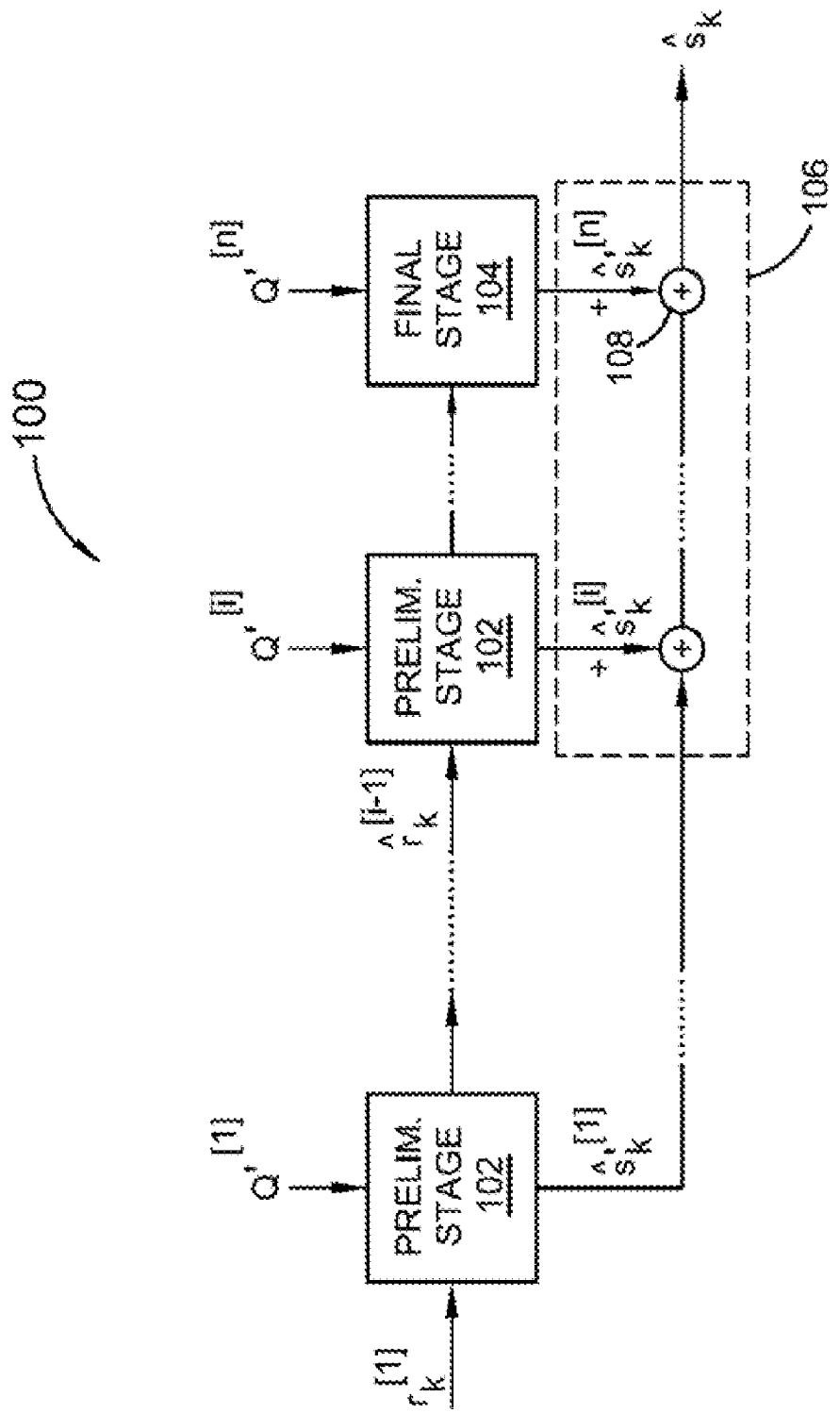
FIG. 2 illustrates a multi-stage SLI equalizer according to one embodiment.
Figure 3:
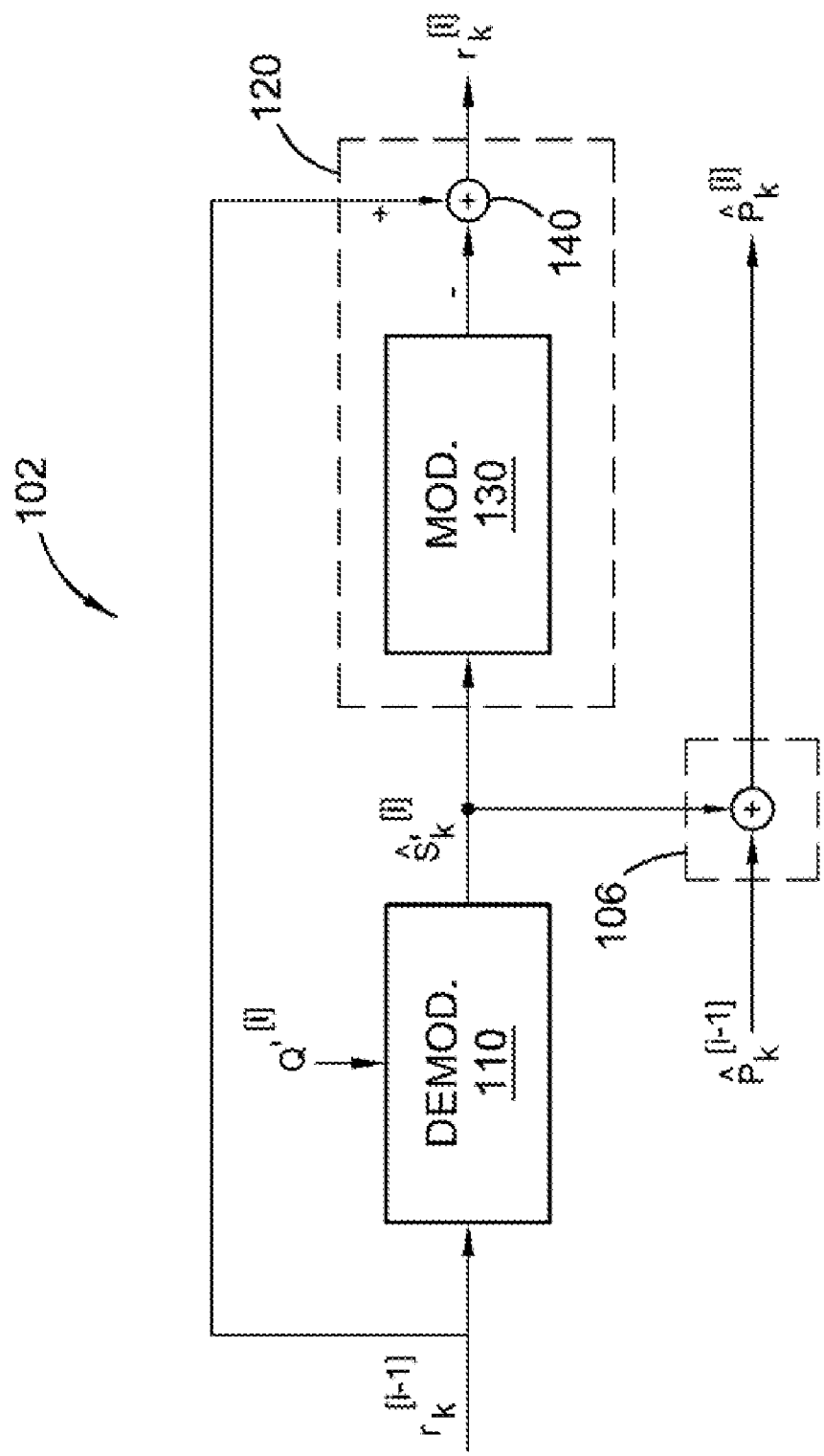
FIG. 3 illustrates a preliminary stage of a multi-stage SLI equalizer according to one embodiment.

FIGS. 2 and 3 illustrate one exemplary embodiment of the multi-stage equalizer 100. The multi-stage equalizer 100 implements a low complexity sequence estimation technique referred to herein a serial localization with indecision (SLI). The multi-stage equalizer 100 includes a plurality of stages 102, 104, including one or more preliminary stages 102 and a final stage 104. Each stage 102, 104 includes a demodulator 110 that simultaneously equalizes and demodulates an input signal to generate an intermediate sequence estimate comprising a sequence of intermediate symbol estimates. The preliminary stages 102 further include a signal generator 120 to generate the input signal to the next stage 102, 104. The signal generator 120 includes a modulator 130 to re-modulate the intermediate symbol estimates generated in the same stage 102 and a combiner 140 to subtract the re-modulated symbols from the input signal to generate a residual signal for input to the next stage. The signal generator 120 is not needed in the final stage 104. A combiner 106 adds the intermediate sequence estimates produced in each stage 102, 104 symbol-by-symbol to produce the final sequence estimate. The combiner 106 may be implemented as a single combiner 106 or as multiple combiners 106 to generate cumulative intermediate symbols estimates $\hat{p}_k^{[i]}$ given by $\hat{p}_k^{[i]} = \hat{s}'_k^{[i]} = \hat{s}'_k^{[1]} + \ldots + \hat{s}'_k^{[i]}$ at each stage 102, 104.

The basic idea underlying SLI is to localize the search for the final sequence estimate in each preliminary stage 102 so that, in the final stage 104, only a subset of full symbol space is searched. The demodulators 110 in each stage are Maximum Likelihood Sequence Estimation (MLSE) demodulators with a reduced state trellis. As will be described in greater detail below, the demodulators 110 in the preliminary stages 102 of the multi-stage equalizer 100 use centroids rather than symbols in the transmit signal constellation for demodulation. The demodulator 110 in the final stage 104 of the multi-stage equalizer 100 uses a reduced state trellis based on a subset of the transmit constellation. The SLI equalization technique is described in U.S. patent application Ser. No. 12/572,692 filed Nov. 2, 2009 titled "Method for Equalization and Whitening of ISI using SLI" and U.S. patent application Ser. No. 12/549,143 filed Aug. 27, 2009 titled "Equalization using Serial Localization with Indecision." Each of these pending applications is incorporated herein in its entirety by reference.

For simplicity, the present invention will be described in a system having one transmit and one receive antenna. The extension to multiple transmit and/or receive antennas is straightforward. For a symbol-spaced channel model with memory M, the received signal can be modeled by:

$$r_k = h_M s_{k-M} + L + h_0 s_k + v_k \qquad \text{Eq. (1)}$$

where $(h_0, \ldots h_M)$ is the channel filter, which is assumed to be constant over the duration of the received signal, and $v_k$ is the noise. The signal $s_k$ has a symbol constellation Q of size q. The noise $v_k$ has correlation $R_v(1)$ and power $P_k$. Assuming that the noise $v_k$ is white, the noise correlation is given by:

$$R_v(1) = P_v \delta(1) \qquad \text{Eq. (2)}$$

For simplicity, it is assumed that the transmitter uses uncoded modulation. The transmitter may use partial response signaling, which in effect, is filtering at the transmitter. The effect of filtering at the transmitter of the receiver may be incorporated into the channel model given in Eq. 1.

For channel estimation, a block of N>M consecutive pilot symbols are transmitted, surrounded by data symbols on both sides. The pilot symbols are denoted $p_0, L, p_{N-1}$. Channel estimate may be obtained using a approach referred to herein as the block maximum likelihood (ML) approach. More specifically, the first M received samples $r_0, L, r_{M-1}$ are discarded to avoid interference the previous block, and the remaining samples $r_M, L, r_{N-1}$ are used for channel estimation. In vector notation, the channel estimation model is given by:

$$\underline{r} = \underline{A}_p \underline{h} + \underline{v} \qquad \text{Eq. (3)}$$

where $\underline{r} = (r_M, L, r_{N-1})^T$, $\underline{h} = (h_0, L, h_M)^T$, $\underline{v} = (v_M, L, v_{N-1})^T$, and $\underline{A}_p$ is a matrix of pilot symbols given by:

$$A_p = \begin{pmatrix} p_M & p_{M-1} & L & p_0 \\ p_{M+1} & p_M & L & p_1 \\ M & M & O & M \\ p_{N-1} & p_{N-2} & L & p_{N-M-1} \end{pmatrix} \qquad \text{Eq. (4)}$$

The channel estimate may be computed according to:

$$\underline{\hat{h}} = (\underline{A}_p^H \underline{R}_v^{-1} \underline{A}_p)^{-1} \underline{A}_p^H \underline{R}_v^{-1} \underline{r} \qquad \text{Eq. (5)}$$

where the matrix $\underline{R}_v$ has dimensions (N−M)×(N−M), and the (i,j)th element is given by:

$$R_{v,ij} = \begin{cases} R_v(j, i) & j \geq i \\ R_v^*(j, i) & j < i \end{cases} \qquad \text{Eq. (6)}$$

The channel estimate can, for example, be used for demodulation as well as other purposes.

Alternatively, an MMSE channel estimator can be obtained by $$\underline{\hat{h}} = \underline{C}_h \underline{A}_p^H (\underline{A}_p \underline{C}_h \underline{A}_p^H + \underline{R}_v)^{-1} \underline{r}, \qquad \text{Eq. (7)}$$

where $\underline{C}_h$ is the covariance matrix of the channel. For example, $\underline{C}_h$ can be computed by taking the average of the outer products of past channel estimate vectors.

The demodulator 110 in each stage 102, 104 of the multi-stage equalizer operates as an MLSE equalizer with a reduced state trellis. The symbol constellation Q of size q is decomposed into a plurality of overlapping subsets. Using 8-ASK as one non-limiting example, the symbol constellation is given by:

$$Q = \{-7, -5, -3, -1, +1, +3, +5, +7\} \qquad \text{Eq. (8)}$$

For a 2-stage SLI equalizer, the symbol constellation may be decomposed into three overlapping subsets given by:

$$\{-7, -5, -3, -1\} \qquad \text{Eq. (9)}$$
$$\{-3, -1, +1, +3\}$$
$$\{+1, +3, +5, +7\}$$

with centroids $\{-4, 0, +4\}$, respectively. Note that the middle subset coincides with 4-ASK. Also, the first subset is shifted from the middle subset by the centroid −4. Similarly, the last subset is shifted from the middle subset by the centroid +4.

The input to the first stage of the SLI equalizer is the received sample stream with received symbols $r_k$. The demodulator 110 in the first stage uses a modified symbol constellation $Q'^{[1]}$, which is equal to the centroid set $\{-4,0,+4\}$ to construct the equalizer trellis. The demodulator 110 produces an intermediate sequence estimate with intermediate symbol decisions $\hat{s}'_k^{[1]}$, which belong to $Q'^{[1]}$.

The symbols $\hat{s}'_k^{[1]}$ are re-modulated to generate a reconstructed signal $\hat{r}'_k^{[1]}$ given by:

$$\hat{r}'_k^{[1]} = h_M \hat{s}'_{k-M}^{[1]} + L + h_0 \hat{s}'_k^{[1]} \qquad \text{Eq. (10)}$$

The received signal is modified by subtracting $\hat{r}'_k^{[1]}$ to generate a residual signal $r_k^{[1]}$ given by:

$$r_k^{[1]} = r_k - \hat{r}'_k^{[1]} \qquad \text{Eq. (11)}$$

The demodulator 110 in the second stage operates as an MLSE demodulator with the residual $r_k^{[1]}$ as its input and uses a reduced state trellis based on the constellation $Q'^{[2]}$, which is set to equal the middle subset of the symbol constellation $\{-3,-1,+1,+3\}$. The demodulator 110 in the final stage 104 generates an intermediate sequence estimate with intermediate symbol decisions $\hat{s}'_k^{[2]}$ selected from the subset $Q'^{[2]}$. The final sequence estimate is derived by summing the intermediate symbol decisions output from each stage 102, 104.

Thus, the symbol decisions in the final sequence estimate are given by:

$$\hat{s}_k = \hat{s}'_k{}^{[1]} + \hat{s}'_k{}^{[2]} \qquad \text{Eq. (12)}$$

Those skilled in the art will appreciate that the overlap between subsets allows the demodulator in a given stage of the equalizer 100 to recover from an erroneous symbol decision made in the preceding stage. The first and second stage equalizers comprises $3^M$ states and $4^M$ states, respectively, compared to $8^M$ states for conventional MLSE demodulation.

The structure of the SLI equalizer 100 can be easily extended to 3 or more stages 102, 104. Each preliminary stage 102 uses a centroid constellation $Q'^{[i]}$ whose symbols represent a subset of the transmit symbol constellation to construct the equalizer trellis and localizes the search for the succeeding stages. The final stage 104 uses a reduced state trellis wherein each trellis stage is constructed using a subset of the transmit signal constellation Q. The input to the first stage 102 is the original received signal. The input to each subsequent stage i is the residual signal $r_k^{[i-1]}$ from the preceding stage i−1 given by (11). Each stage i generates an intermediate sequence estimate comprising intermediate symbol decisions $\hat{s}'_k{}^{[i]}$. The re-modulated signal at each preliminary stage 102 is given by:

$$\hat{r}'_k{}^{[i]} = h_M \hat{s}'_{k-M}{}^{[i]} + L + h_0 \hat{s}'_k{}^{[i]} \qquad \text{Eq. (13)}$$

The re-modulated signal $\hat{r}_k^{[i]}$ in each preliminary stage 102 is subtracted from the signal $r_k^{[i-1]}$ output from the preceding stage to generate the residual signal $r_k^{[i]}$ for input to stage i+1. The final sequence estimate is the sequence derived by summing the symbols in the intermediate sequence estimates one by one. Thus, the final estimate for a symbol is given by:

$$\hat{s}_k = \hat{s}'_k{}^{[1]} + L + \hat{s}'_k{}^{[N]} \qquad \text{Eq. (14)}$$

Consider the 2 stage structure again. By using the centroid constellation $Q'^{[1]}$, the demodulator 110 in the preliminary stage 102 is effectively modeling the received signal $r_k$ as:

$$r_k = (h_M \hat{s}_{k-M}{}^{[1]} + L + h_0 \hat{s}'_k{}^{[1]}) + x_k \qquad \text{Eq. (15)}$$

The noise term $x_k$ absorbs the contribution of $s_k^{[2]}$. That is, $$\begin{aligned} x_k &= (h_M s_{k-M}^{[2]} + L + h_0 s_k^{[2]}) + v_k \qquad \text{Eq. (16)} \\ &= w_k + v_k \end{aligned}$$

The term $w_k$ is due to the use of centroids instead of actual constellation points. It is an interference signal that affects the performance of the demodulator 110 adversely. In the 2-stage SLI equalizer 110, the demodulator 110 in the final stage 104 will explicitly estimate $\hat{s}'_k{}^{[2]}$ but that doesn't help the demodulator 110 in the preliminary stage 102.

Fortunately, $w_k$ is a correlated signal, due to the filtering by the channel response $h_k$, as can be seen in Eq. (16). The correlation of $w_k$ is given by $$R_w(1) = P_2 \sum_k h_k^* h_{k+1} \qquad \text{Eq. (17)}$$

where by definition, $h_k = 0$ outside the interval $0 \leq k \leq M$. The power $P_2$ is given by $$P_2 = \frac{1}{q'^{[2]}} \sum_{s \in Q'^{[2]}} |s|^2 \qquad \text{Eq. (18)}$$

The power spectrum of $w_k$ is the Fourier transform of $R_w(1)$. It can be written as $$S_w(f) = P_2 |H(f)|^2 \qquad \text{Eq. (19)}$$

where H(f) is the Fourier transform of $h_k$.
The total noise $x_k = w_k + v_k$ has correlation $$R_x(1) = R_w(1) + R_v(1) \qquad \text{Eq. (20)}$$

The power spectrum of $x_k$ can be written as $$S_x(f) = P_2 |H(f)|^2 + S_v(f) \qquad \text{Eq. (21)}$$

If $v_k$ is white, then $$S_x(f) = P_2 |H(f)|^2 + P_v \qquad \text{Eq. (22)}$$

A multi-stage-equalizer 100 can be constructed based on nested subsets. For example, a three-stage equalizer 100 may be used for demodulating 8-ASK. The first stage constructs a reduced state equalizer trellis using the centroid constellation $Q'^{[1]} = \{-4, 0, +4\}$, which may be used in the first stage of the equalizer. The second stage constructs a reduced state trellis using the constellation given by:

$$Q'^{[2]} = \{-2, 0, +2\}. \qquad \text{Eq. (23)}$$

The final stage constructs a reduced state trellis using the BPSK subsets of transit signal constellation given by:

$$Q'^{[3]} = \{-1, +1\} \qquad \text{Eq. (24)}$$

Figure 4:
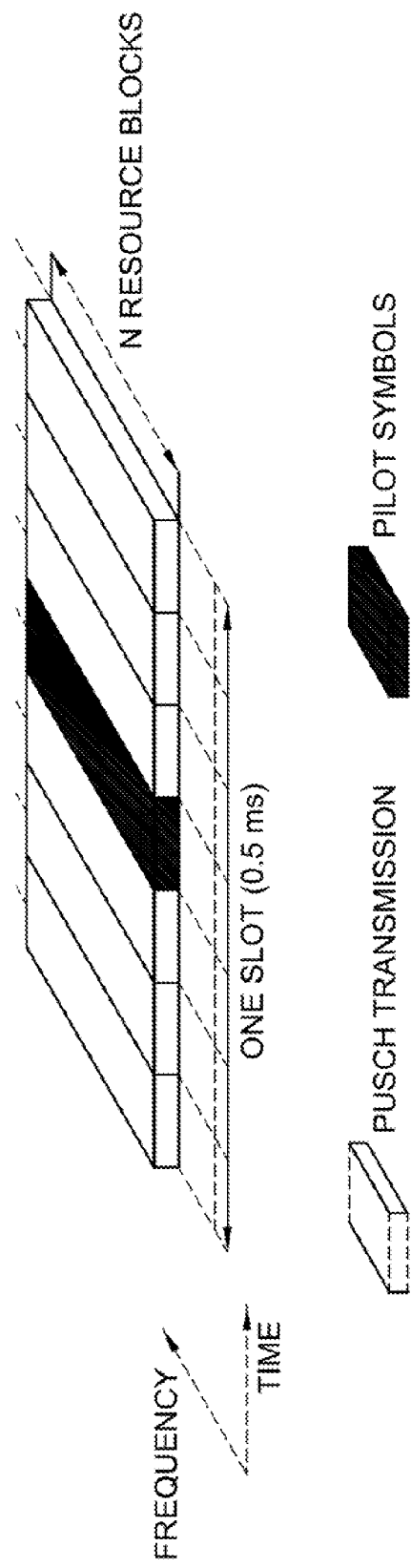
FIG. 4 illustrates the signal structure for uplink transmission in an LTE system.

The invention is generally applicable to any wireless systems where pilot symbols are seen as a block in the time domain, i.e., an entire block is dedicated to pilot. FIG. 4 illustrates the signal structure for LTE uplink transmission. In the uplink, an entire SC-FDMA symbol is dedicated to transmit pilot symbols for channel estimation. If $P_0, P_1, \ldots, P_{N_c-1}$ represents the frequency domain pilot symbols shown in FIG. 4, then the time domain pilot symbols are given by:

$$p_i = \sum_{k=0}^{N_c-1} P_k e^{j2\pi k \Delta f i T_s}, \qquad \text{Eq. (25)}$$

where of $\Delta f = 15$ kHz, $T_s$ is the inverse of sampling frequency for obtaining the receive samples r. Assuming that r is obtained after discarding the cyclic prefix, which is assumed to be greater than the channel memory. Using $p_i$ to formulate matrix $A_p$ as defined in (4), the ML channel estimator given in (5) applies.

While SLI provides a low complexity approximation to MLSE, consecutive reconstruction of signals with noisy channel estimates may degrade SLI performance. Therefore, in an alternate embodiment of the present invention, shown in FIG. 5, the SLI structure shown is modified to generate cumulative symbol estimates in one or more early stages of the equalizer 100 to uses as effective pilot symbols to improve channel estimation for later stages 102, 104. To briefly summarize, at a given stage i of the multi-stage equalizer 100, the cumulative symbol estimates $\hat{p}_k^{[i]}$ can be used as effective pilot symbols. The cumulative symbol estimates $\hat{p}_k^{[i]}$ are then fed to a channel estimator to help generate a new channel estimate for subsequent stages of the multi-stage equalizer 100.

Figure 5:
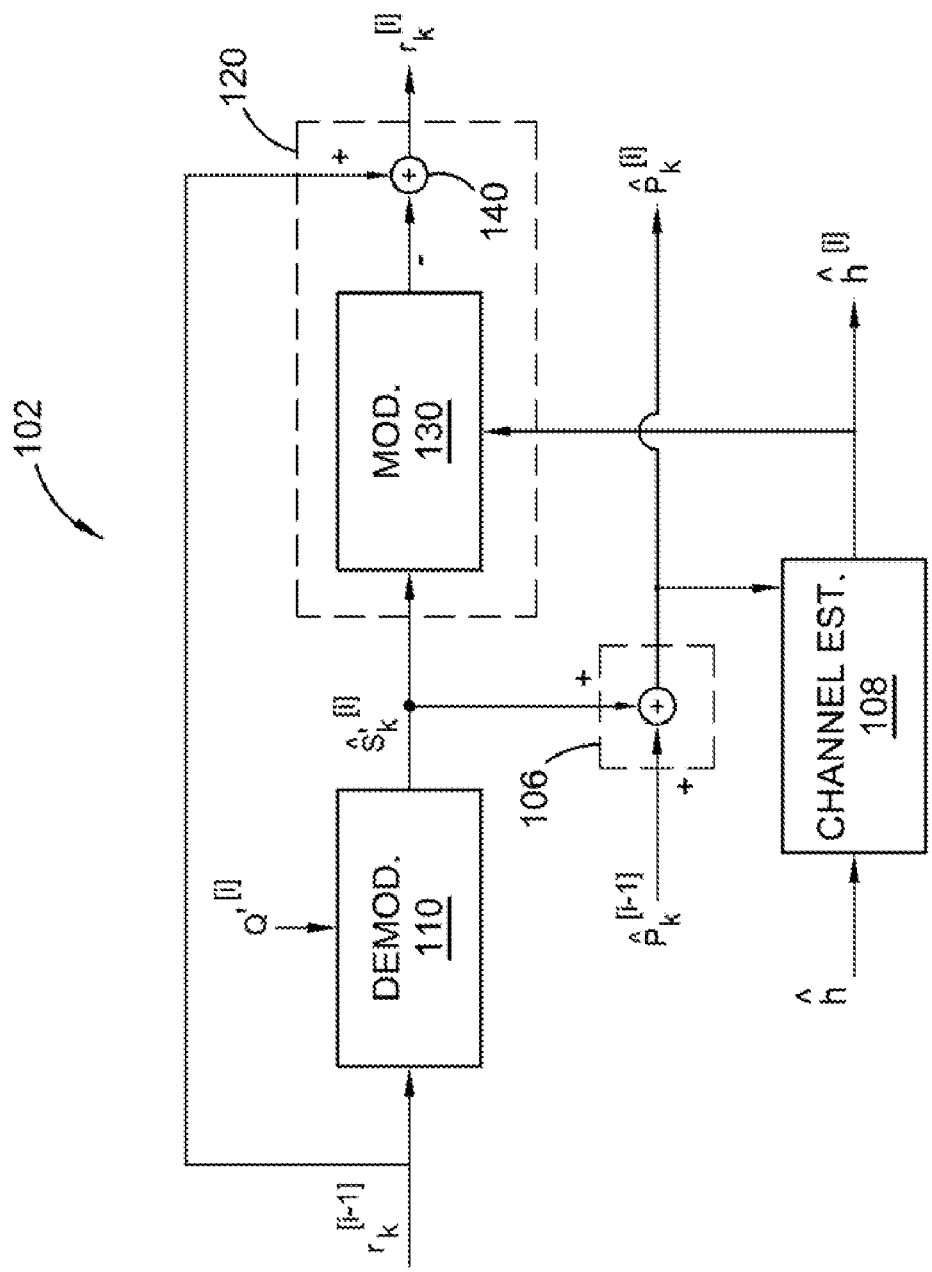
FIG. 5 illustrates a preliminary stage of a multi-stage SLI equalizer according to a second embodiment.

The preliminary stage 102 shown in FIG. 5 includes a demodulator 110 and signal generator 120 as previously described. This embodiment differs from the previous embodiment in that the cumulative symbol estimates $\hat{p}_k^{[i]}$ produced by the combiner 106 are fed to channel estimator 108 for generating improved channel estimates for later stages 102, 104. Thus, the combiner 106 serves as an effective pilot signal generator. More particularly, the combiner 106 combines the intermediate symbol decision $\hat{s}'^{[i]}_k$ in a given stage with the cumulative symbol estimate $\hat{p}^{[i]}_k$ from a previous stage 102 to generate a new cumulative symbol estimate $\hat{p}^{[i]}_k$ which is used as an effective pilot symbol. The effective pilot symbol $\hat{p}^{[i]}_k$ is fed to the channel estimator to compute an improved channel estimate.

In vector notation, the channel estimation model using effective pilot symbols is given by:

$$\underline{r}_1 = \underline{A}_{\hat{p}[i]} \underline{h} + \underline{x}_i;$$ Eq. (26)

where $\underline{r}_1$, and $\underline{x}_i$ have size (N'−M), and $\underline{A}_{\hat{p}[i]}$ is defined according to Eq. 4 using the effective pilots. In one exemplary embodiment, the refined channel estimation method uses the true pilot block and the effective pilot block simultaneously, to produce channel estimates according to:

$$\hat{\underline{h}}^{[i]} = (A_p^H R_v^{-1} A_p + A_{\hat{p}[i]}^H \underline{R}_{x_i}^{-1} A_{\hat{p}[i]})^{-1} (A_p^H R_v^{-1} \underline{r} + \underline{A}_{\hat{p}[i]}^H \underline{R}_{x_i}^{-1} \underline{r}_1)$$ Eq. (27)

where the matrix $\underline{R}_{x_i}$ has dimensions (N'−M)×(N'−M), and its elements are derived from the correlation function $R_{x_i}(l)$ according to Eq. (2). The refined channel estimates $\hat{\underline{h}}^{[i]}$ can now be used for demodulation in stage i+1 and for signal reconstruction in stage i.

The extension from one block of effective pilots to multiple separate blocks of effective pilots follows naturally. One reason to use multiple blocks is to be able to use data from different spots in the received signal. Another reason is to keep the block size reasonably small, which keeps the complexity of the matrix inverse $\underline{R}_{x_i}^{-1}$ under control.

In another exemplary embodiment, the average of the initial channel estimates $\hat{h}$ and the contribution from the effective pilot block is used to generate the refined channel estimates $\hat{\underline{h}}^{[i]}$. That is the refined channel $\hat{\underline{h}}^{[i]}$ estimates is given by:

$$\hat{\underline{h}}^{[i]} = \hat{\underline{h}} + (A_{\hat{p}[i]}^H \underline{R}_{x_i}^{-1} A_{\hat{p}[i]})^{-1} (\underline{A}_{\hat{p}[i]}^H \underline{R}_{x_i}^{-1} \underline{r}_1)$$ Eq. (28)

Again, this simplified method extends naturally to the case of multiple blocks of effective pilots.

Note that $R_{x_i}$ accounts for residual interference, and thus the refined channel estimation term $(A_{\hat{p}[i]}^H \underline{R}_{x_i}^{-1} A_{\hat{p}[i]})^{-1} A_{\hat{p}[i]}^H \underline{R}_{x_i}^{-1} \underline{r}_i$ Eq. 26 is scaling inversely proportional to the noise plus interference power.

For MMSE channel estimation, a similar approach can be applied. Using the effective pilot block to refine the channel estimate obtained from the pilot symbol block, $$\hat{\underline{h}}^{[i]} = \hat{\underline{h}} + C_h A_{\hat{p}[i]}^H (A_{\hat{p}[i]} C_h A_{\hat{p}[i]}^H + R_{x_i})^{-1} \underline{r}_i$$ Eq. (29)

The channel estimate obtained from the previous stage can be used to calculate the channel covariance given by:

$$C_h \approx \hat{\underline{h}}^{[i-1]} (\hat{\underline{h}}^{[i-1]})^H$$ Eq. (30)

We may choose to refine the channel estimates at selected stages in a multi-stage SLIC. One approach is to refine the channel estimates in early stages only, in a pre-determined manner. The idea is that once the estimates are good enough, there is no reason to refine them further. Another approach is to consider the quality of the channel estimates, and decide accordingly whether to refine them. For instance, if the noise correlation matrix $R_v$ is relatively small, then the channel estimate $\hat{h}$ is considered reliable, and there is no need to refine it. To decide if the correlation matrix $R_v$ is small, we can consider its diagonal elements, or its eigenvalues, or use any classical matrix norm.

Another approach is to include the data from the effective pilots only if it is considered reliable. For instance, we can compare the noise correlation matrix $R_x$ for the effective pilots with the noise correlation matrix measured from the original pilot symbols. If $R_x$ is relatively large (in the norm or eigenvalue sense etc as discussed above), then we may skip the refinement.

Since the effective pilots are demodulator decisions, their reliability is in question. Fortunately, because of the use of centroids in SLI, the Euclidean distance between centroids is larger than the Euclidean distance between true symbols, so they tend to be more reliable in relative terms. Nevertheless, it may be useful to reduce the contribution of the effective pilots to the refined channel estimates. One approach is to scale down the terms corresponding to the effective pilots. That is, we can choose a parameter α, say between 0 and 1, that reflects the reliability of the effective pilots. Then we can modify the refined estimate as follows $$\hat{\underline{h}}^{[i]} = (A_p^H R_v^{-1} A_p + \alpha A_{\hat{p}[i]}^H \underline{R}_x^{-1} A_{\hat{p}[i]})^{-1} (A_p^H R_v^{-1} \underline{r} + \alpha A_{\hat{p}[i]}^H \underline{R}_x^{-1} \underline{r}_1)$$ Eq. (31)

Similarly, we can choose a parameter β, and modify the simplified refined estimate as follows $$\hat{\underline{h}}^{[i]} = \hat{\underline{h}} + \beta (A_{\hat{p}[i]}^H \underline{R}_x^{-1} A_{\hat{p}[i]})^{-1} (\underline{A}_{\hat{p}[i]}^H \underline{R}_x^{-1} \underline{r}_1)$$ Eq. (32)

The parameters α and β may be chosen based on the expected reliability of the effective pilots, which is reflected in the noise covariance $R_x$.

The present invention offers an enhancement to the SLI receiver, by improving channel estimation, which is critical since channel estimates a repeatedly used in signal reconstruction and subtraction.

In some embodiments, a whitening filter may be used to transform the noise term $x_k$ into a white noise. If G(f) denotes the frequency domain representation of the whitening filter, then whitening may be performed by choosing a filter G(f) such that $$|G(f)|^2 = \frac{1}{S_x(f)}$$ Eq. (33)

The filter G(f) is not unique. Thus, there is flexibility in designing G(f) to have certain attractive features, such as minimum phase.

Figure 6:
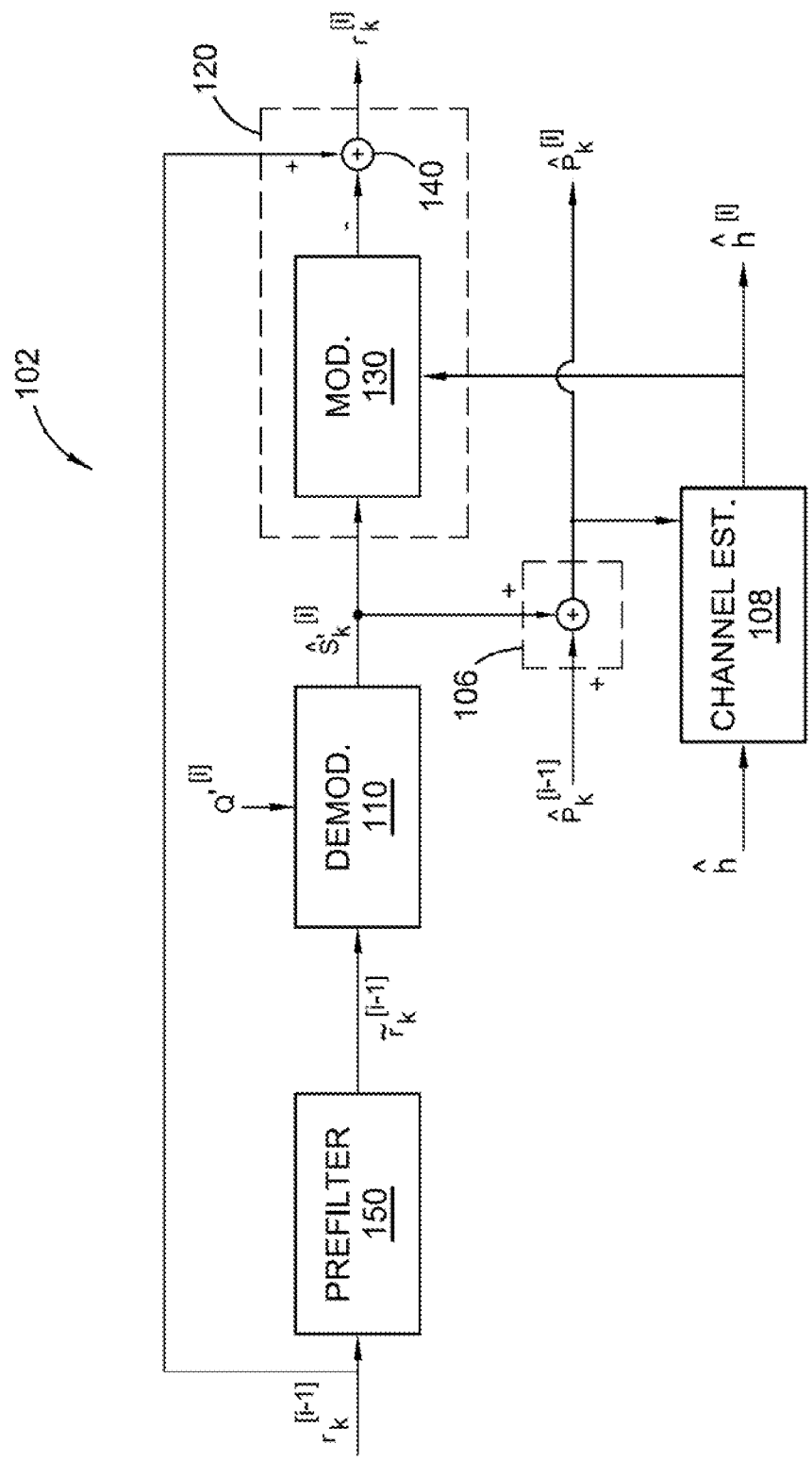
FIG. 6 illustrates a preliminary stage of a multi-stage SLI equalizer according to a third embodiment.

In one exemplary embodiment, shown in FIG. 6, the whitening filter G(f) is used to pre-filter the received signal before it is input to the multi-stage equalizer. In this embodiment, the received signal $r_k$ is filtered in a pre-filter 150 using $g_k$ to produce an input signal for $\tilde{r}_k$ the first stage 102 of the multi-stage equalizer, where $g_k$ denotes the impulse response corresponding to G(f). The effective channel $\tilde{h}_k$ of the output $\tilde{r}_k$ is the convolution of $g_k$ and $h_k$. The MLSE now operates on $\tilde{r}_k$, using the channel $\tilde{h}_k$. The state space of the MLSE grows, because $\tilde{h}_k$ has more taps. Further discussion about how to reduce the state space with little performance loss is provided in the previously mentioned U.S. patent application Ser. No. 12/572,692 filed Nov. 2, 2009 titled "Method for Equalization and Whitening of ISI using SLI."

The symbols $\hat{s}'^{[1]}_k$ out of the MLSE are re-modulated using the original filter $h_k$ according to Eq. 11. The modified received signal is produced according to Eq. 12. The second stage is unchanged.

Figure 7:
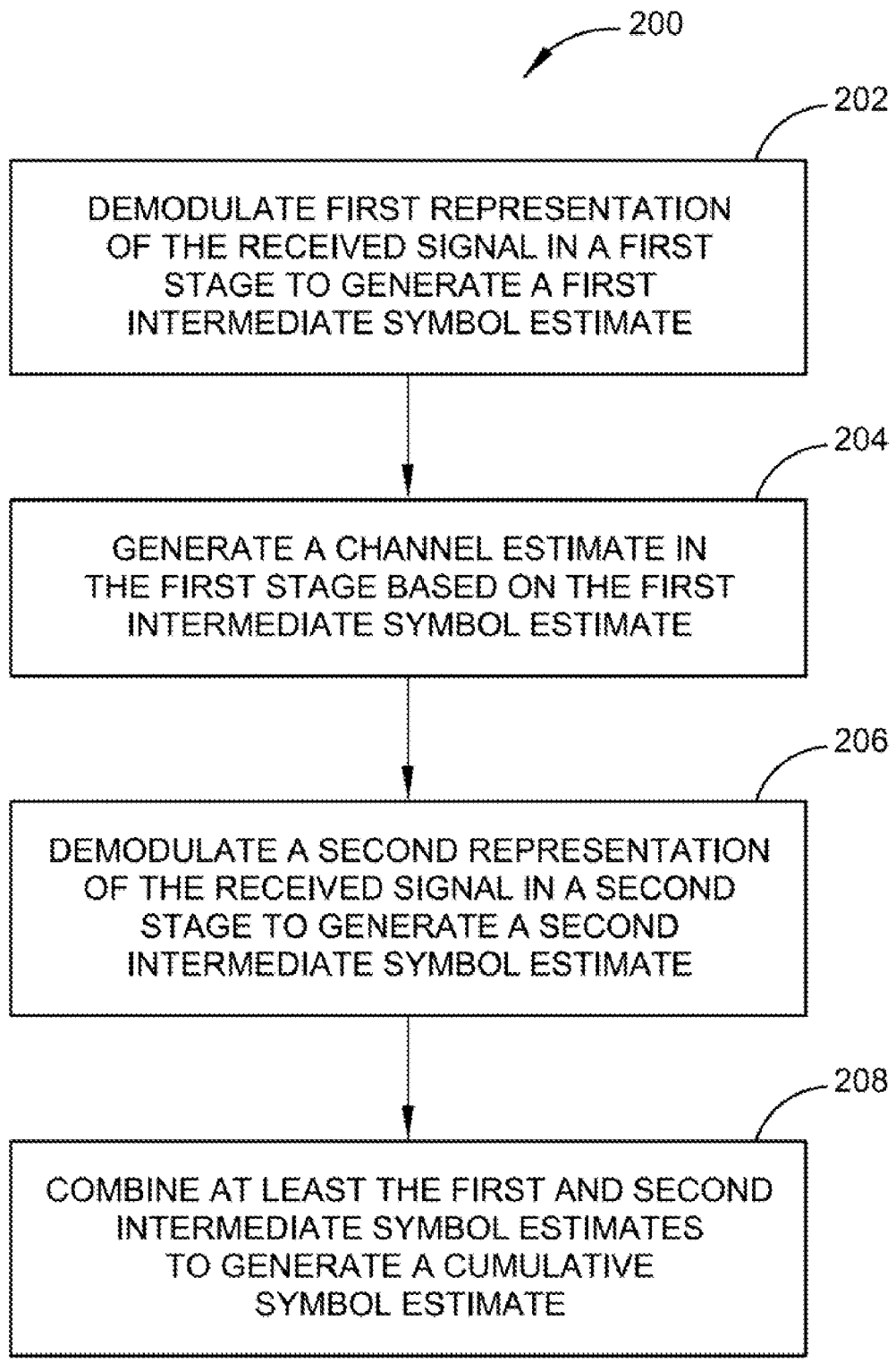
FIG. 7 illustrates an exemplary method of equalizing a received signal according to one embodiment.

FIG. 7 illustrates an exemplary method 200 of demodulating a received signal in a multi-stage receiver. In the exemplary method, it is assumed that the received signal is transmitted from a single transmit antenna to two or more receive antennas and is demodulated in a multi-stage equalizer 100. The multi-stage equalizer 100 demodulates a first representation of the received signal in a first stage to generate a first intermediate sequence estimate comprising a plurality of intermediate symbol estimates (block 202). The intermediate symbol estimates are then used to generate effective pilot symbols for channel estimation. For example, the intermediate symbol estimates may be added with intermediate symbol estimates or cumulative symbol estimates from prior stages 102 to generate a new cumulative symbol estimates. The effective pilot symbols are fed to a channel estimator 108, which uses the effective pilot symbols to generate a channel estimate (block 204). As previously noted, the channel estimates can be generated based on effective pilot symbols and actual pilot symbols. Alternatively, separate channel estimates can be produced based on the effective pilot symbols and actual pilot symbols respectively and then combined to produce a combined channel estimate. In either case, the final channel estimate is used in a subsequent stage of the multi-stage equalizer to demodulate a second representation of the receive signal to generate a second intermediate sequence estimate comprising a plurality of second intermediate symbol estimates (block 206). The first and second intermediate symbol estimates are combined symbol by symbol to generate cumulative symbol estimates (block 208). The first and second intermediate symbol estimates may also be combined with other symbol estimates. In the final stage 104 of the equalizer 100, the cumulative symbol estimate represents the final demodulator decision.

The present invention offers an enhancement to the SLI receiver, by improving channel estimation, which significantly improves performance because the channel estimates are repeatedly used in signal reconstruction and subtraction.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of demodulating a received signal in a multi-stage receiver, said method comprising:
    demodulating a first representation of the received signal in a first stage of the receiver to generate a first intermediate symbol estimate;
    generating a channel estimate based on the first intermediate symbol estimate;
    demodulating a second representation of the received signal in a second stage of the receiver using the channel estimate to generate a second intermediate symbol estimate;
    combining at least the first and second intermediate symbol estimates from the first and second stages to generate a cumulative symbol estimate; and
    generating an improved channel estimate based on the cumulative symbol estimate.

2. The method of claim 1 wherein demodulating a first representation of the received signal comprises demodulating the first representation of the received signal using a set of centroid-based values as a symbol constellation.

3. The method of claim 2 wherein the second stage is the final stage and wherein demodulating a second representation of the received signal in the second stage of the multi-stage receiver comprises demodulating the second representation of the received signal using a transmit symbol constellation associated with the received signal.

4. The method of claim 3 further comprising generating a next representation of the received signal for input to a succeeding stage of the receiver based on the first intermediate symbol estimate.

5. The method of claim 4 wherein generating a next representation of the received signal comprises:
    modulating the first intermediate symbol estimate to generate a reconstructed signal; and
    subtracting the reconstructed signal from the first signal representation to generate a residual signal for input to the succeeding stage of the receiver.

6. The method of claim 5 wherein demodulating a second representation of the received signal in a second stage of the multi-stage receiver comprises demodulating the residual signal generated in the first stage of the receiver.

7. The method of claim 1 further comprising generating the second representation of the received signal based on a prior intermediate symbol decision output in a preceding stage of the receiver.

8. The method of claim 7 wherein generating the second representation of the received signal comprises:
    modulating the prior intermediate symbol estimate from the preceding stage to generate a reconstructed signal; and
    subtracting the reconstructed signal from a signal representation demodulated in the preceding stage to generate the second signal representation.

9. The method of claim 8 wherein combining at least the first and second intermediate symbol estimates from the first and second stages to generate a cumulative symbol estimate comprises adding the first and second intermediate symbol estimates.

10. The method of claim 1 wherein generating a channel estimate based on the first intermediate symbol estimate comprises:
    generating effective pilot symbols based on the first intermediate symbols estimates; and
    generating channel estimates based on the effective pilot symbols.

11. The method of claim 10 wherein generating effective pilot symbols based on the first intermediate symbols estimates comprises adding the first intermediate symbol estimate to one or more prior intermediate symbol estimates to generate a cumulative symbol estimate to use as an effective pilot symbol.

12. The method of claim 10 wherein generating channel estimates based on the effective pilot symbols comprises jointly processing said effective pilot symbols and received reference symbols to generate said channel estimates.

13. The method of claim 10 wherein generating channel estimates based on the effective pilot symbols comprises:
    computing a first channel estimate based on received reference symbols;
    computing a second channel estimate based on said effective pilot symbols; and
    combining said first and second channel estimates to generate a final channel estimate.

14. A receiver for demodulating a received signal in a multi-stage receiver, said method comprising:
    a first demodulator in a first stage of the receiver to demodulate a first representation of the received signal to generate a first intermediate symbol estimate;
    a channel estimator to generate a channel estimate based on the first intermediate symbol estimate;
    a second demodulator in a second stage of the receiver to demodulate a second representation of the received signal in a second stage of the receiver using the channel estimate to generate a second intermediate symbol estimate; and a combiner to combine at least the first and second intermediate symbol estimates from the first and second stages to generate a cumulative symbol estimate, wherein the channel estimator generates an improved channel estimate based on the cumulative symbol estimate.

15. The receiver of claim 14 wherein the first demodulator uses a set of centroid-based values as a symbol constellation to demodulate the second representation of the received signal.

16. The receiver of claim 15 wherein the second demodulator uses a transmit symbol constellation associated with the received signal to demodulate the second representation of the received signal.

17. The receiver of claim 16 further comprising a signal generator in the first stage to generate a next representation of the received signal for input to a succeeding stage of the receiver based on the first intermediate symbol estimate.

18. The receiver of claim 17 wherein the signal generator comprises:
a modulator to modulate the first intermediate symbol estimate to generate a reconstructed signal; and
a combining circuit configured to subtract the reconstructed signal from the first signal representation to generate a residual signal for input to the succeeding stage of the receiver.

19. The receiver of claim 18 wherein the second demodulator demodulates the residual signal generated in the first stage of the receiver.

20. The receiver of claim 14 further comprising a signal generator to generate the second representation of the received signal based on a prior intermediate symbol decision output in a preceding stage of the receiver.

21. The receiver of claim 20 wherein the signal generator comprises:
a modulator to modulate the prior intermediate symbol estimate from the preceding stage to generate a reconstructed signal; and
a combining circuit configured to subtract the reconstructed signal from a signal representation demodulated in the preceding stage to generate the second signal representation.

22. The receiver of claim 21 wherein the combiner is configured to add at least the first and second intermediate symbol estimates.

23. The receiver of claim 14 wherein the channel estimator is configured to generate effective pilot symbols based on the first intermediate symbols estimates comprises adding the first intermediate symbol estimate to one or more prior intermediate symbol estimates to generate a cumulative symbol estimate to use as an effective pilot symbol.

24. The receiver of claim 23 wherein the channel estimator is configured to jointly process said effective pilot symbols and received reference symbols to generate said channel estimate.

25. The receiver of claim 23 wherein the channel estimator is configured to:
compute a first channel estimate based on received reference symbols;
compute a second channel estimate based on said effective pilot symbols; and
combine said first and second channel estimates to generate a final channel estimate.

* * * * *

UNITED STATES PATENT AND TRADEMARK OFFICE
CERTIFICATE OF CORRECTION

PATENT NO. : 8,396,168 B2
APPLICATION NO. : 12/760839
DATED : March 12, 2013
INVENTOR(S) : Khayrallah et al.

It is certified that error appears in the above-identified patent and that said Letters Patent is hereby corrected as shown below:

In the Specifications

In Column 1, Line 22, delete "With" and insert -- with --, therefor.

In Column 4, Lines 8-10, in Equation (6), delete "$R_{v,ij} = \begin{cases} R_v(j,i) & j \geq i \\ R_v^*(j,i) & j < i \end{cases}$" and insert -- $R_{v,ij} = \begin{cases} R_v(j-i) & j \geq i \\ R_v^*(j-i) & j < i \end{cases}$ --, therefor.

In Column 5, Line 37, in Equation (15), delete "$r_k = (h_M \hat{s}_{k-M}^{'[1]} + L + h_0 \hat{s}_k^{'[1]}) + x_k$" and insert -- $r_k = \left( h_M \hat{s}_{k-M}^{'[1]} + L + h_0 \hat{s}_k^{'[1]} \right) + x_k$ --, therefor.

Signed and Sealed this
Eleventh Day of June, 2013

Teresa Stanek Rea
*Acting Director of the United States Patent and Trademark Office*